United States Patent
Zwayer et al.

[11] Patent Number: 6,138,935
[45] Date of Patent: Oct. 31, 2000

[54] TWO PIECE COVER FOR FISHING REEL

[75] Inventors: Kent L. Zwayer, Tulsa, Okla.; Robert Worrell, Eden Praire, Minn.

[73] Assignee: ZEBCO division of Brunswick Corp, Lake Forest, Ill.

[21] Appl. No.: 08/868,297

[22] Filed: Jun. 3, 1997

[51] Int. Cl.[7] ................................................. A01K 89/01
[52] U.S. Cl. ......................... 242/311; 242/238; D22/137; D22/140
[58] Field of Search ................................... 242/235, 236, 242/237, 238, 239, 240, 310, 311; D22/137, 138, 140, 141

[56] References Cited

U.S. PATENT DOCUMENTS

| D. 255,702 | 7/1980 | Iinuma . |
| D. 269,452 | 6/1983 | Fee et al. . |
| D. 273,219 | 3/1984 | Iinuma ..................................... D22/141 |
| D. 314,604 | 2/1991 | Jackson et al. .......................... D22/141 |
| 3,059,873 | 10/1962 | Hull ........................................ 242/238 |
| 3,175,781 | 3/1965 | Maury et al. ........................ 242/311 X |
| 3,836,092 | 9/1974 | Hull ..................................... 242/311 X |
| 4,172,566 | 10/1979 | Noda ........................................ 242/237 |
| 4,331,303 | 5/1982 | Moss ........................................ 242/311 |
| 4,496,115 | 1/1985 | Kreft et al. . |
| 4,637,569 | 1/1987 | Swisher ................................... 242/239 |
| 4,821,978 | 4/1989 | Kaneko . |
| 5,149,010 | 9/1992 | Bacher ................................... 242/311 |

OTHER PUBLICATIONS

ZEBCO, 33N, Exploded Diagram and Parts List, Rev. Nov. 1990.
ZEBCO, ONE CLASSIC, Exploded Diagram and Parts List, Rev. Nov. 1990.
ZEBCO, 33 CLASSIC, Exploded Diagram and Parts List, Rev. Nov. 1990.
ZEBCO, 38 Exploded Diagram and Parts List, Rev. 1190.
ZEBCO, Pro Staff 2010N, 2020N, 2030N, Exploded Diagram and Parts List, Rev. Nov. 1990.
ZEBCO, 164, 60SR, Exploded Diagram and Parts List, Rev. Nov. 1990.
ZEBCO, 357 Exploded Diagram and Parts List, Rev. Nov. 1990.
ZEBCO, CR60 Crappie Reel Exploded Diagram and Parts List, Rev. Nov. 1990.
ZEBCO, 606 (1986 Model), Exploded Diagram and Parts List, Rev. Nov. 1990.
ZEBCO, 733 HAWG, Exploded Diagram and Parts List, Rev. Nov. 1990.
ZEBCO, 808N, Exploded Diagram and Parts List, Rev. Nov. 1990.

*Primary Examiner*—Donald P. Walsh
*Assistant Examiner*—Emmanuel M. Marcelo

[57] ABSTRACT

A fishing reel cover comprising: (a) a first cover piece having an exterior and (b) a second cover piece having a second piece wall. The second piece wall includes at least one aperture provided therethrough. The second cover piece is positionable over the first piece such that the exterior of the first cover piece is visible through the second piece aperture. The second cover piece preferably includes a plurality of apertures through which the exterior of the first cover piece is visible. Most preferably, the second cover piece includes a plurality of such apertures arranged to form a gripping structure.

25 Claims, 12 Drawing Sheets

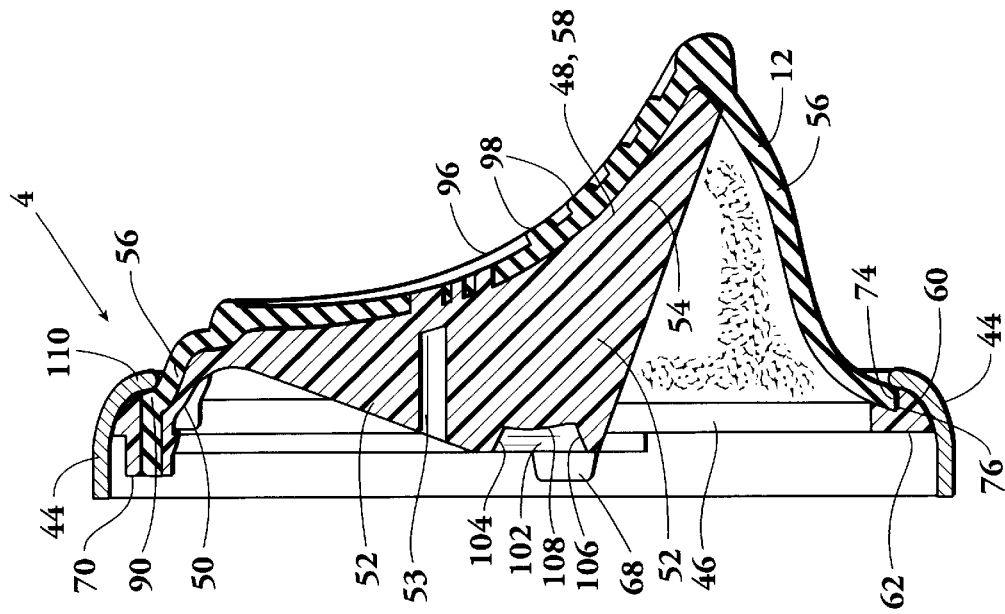
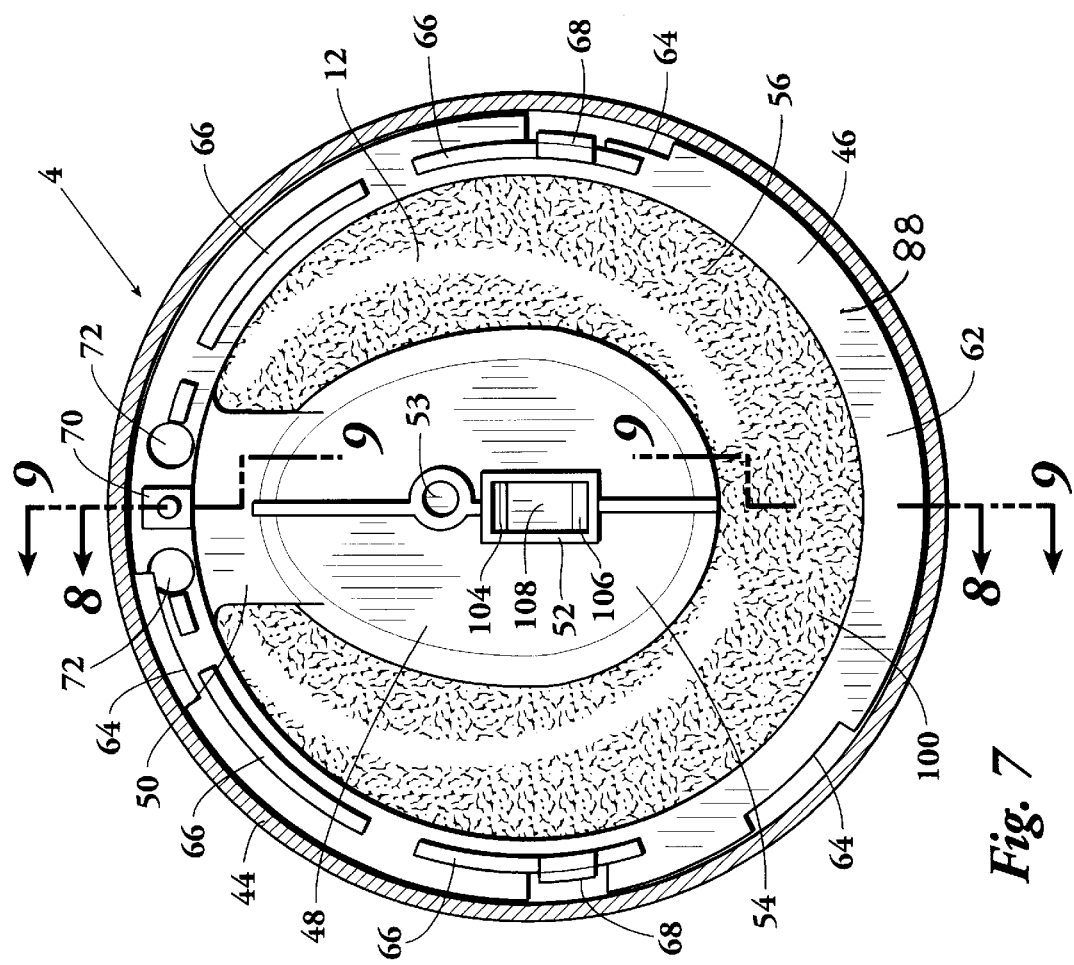

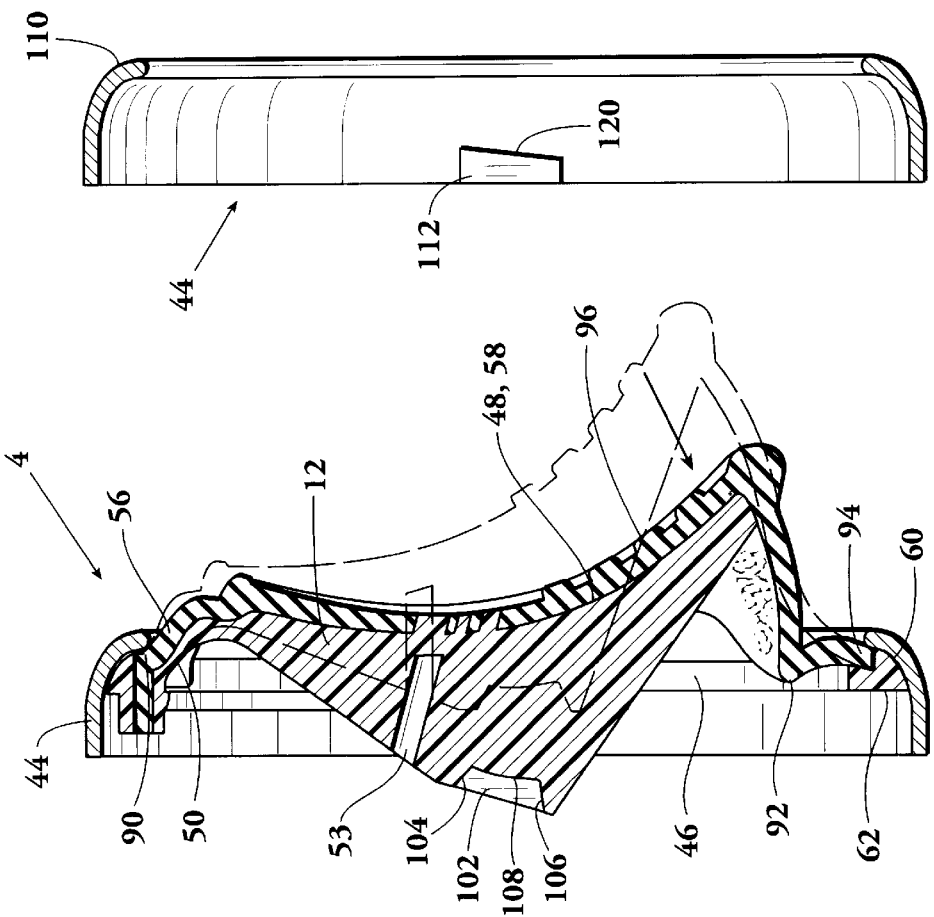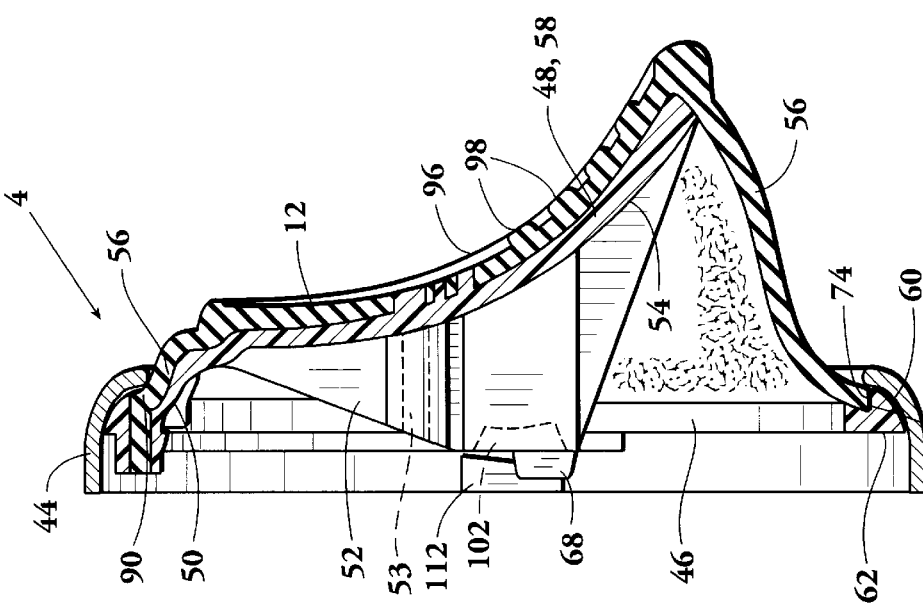

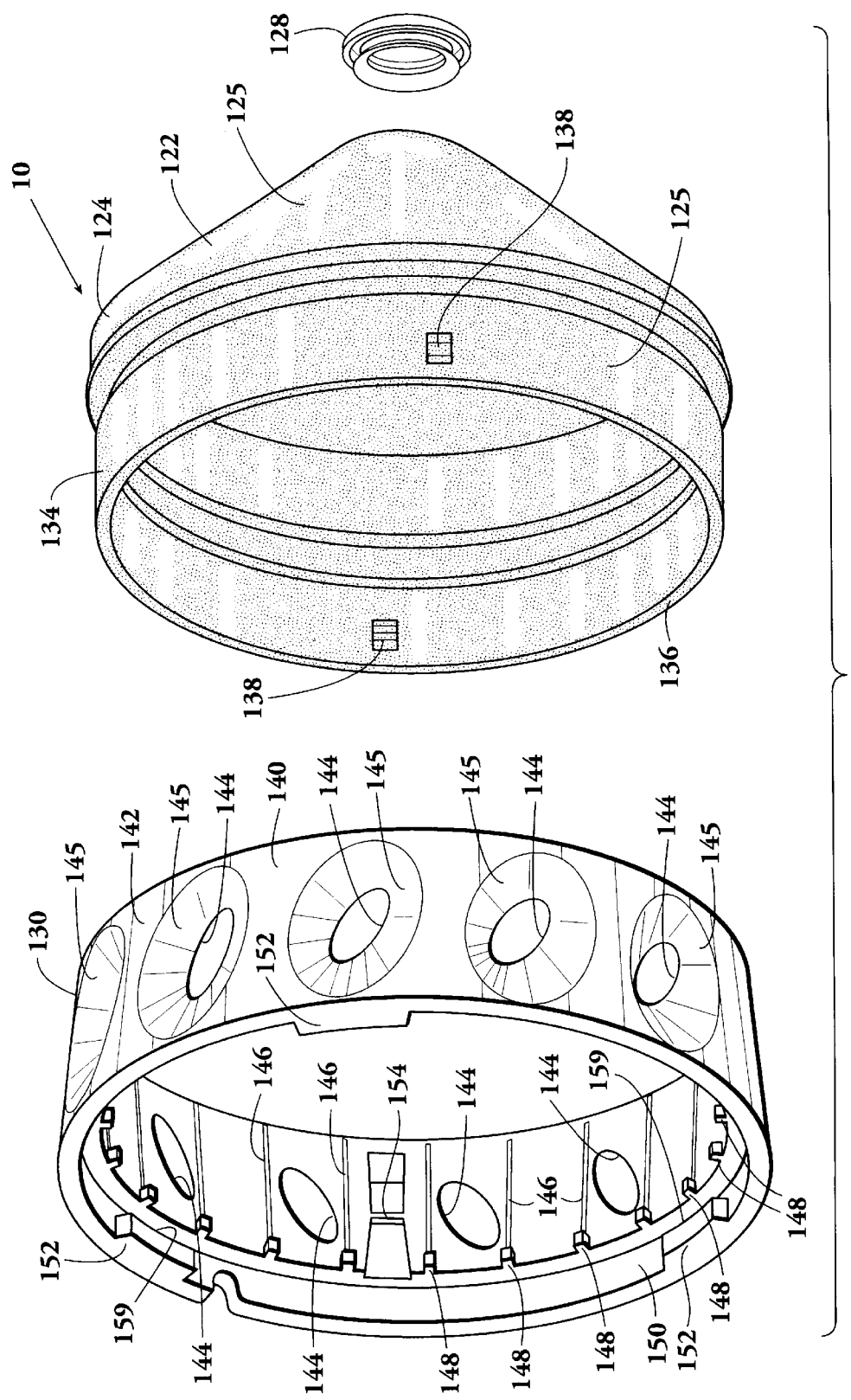

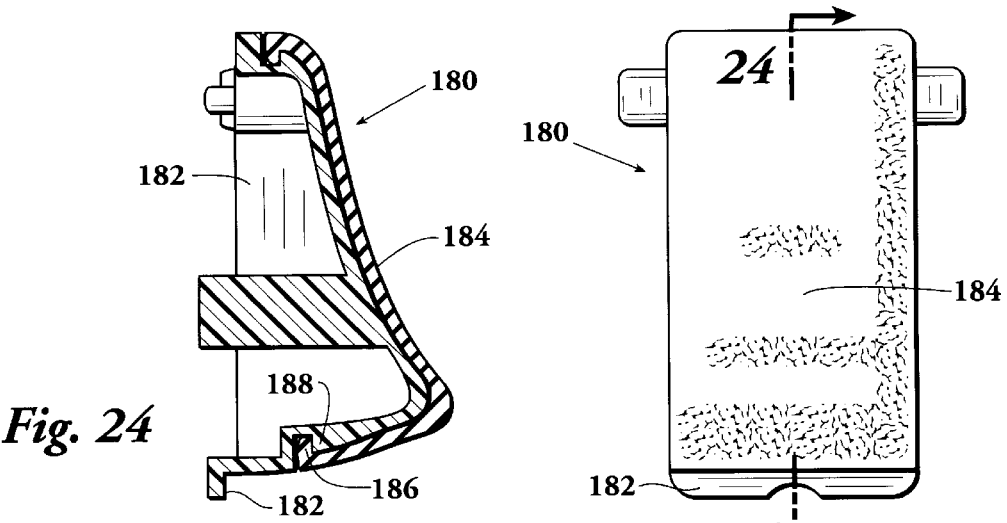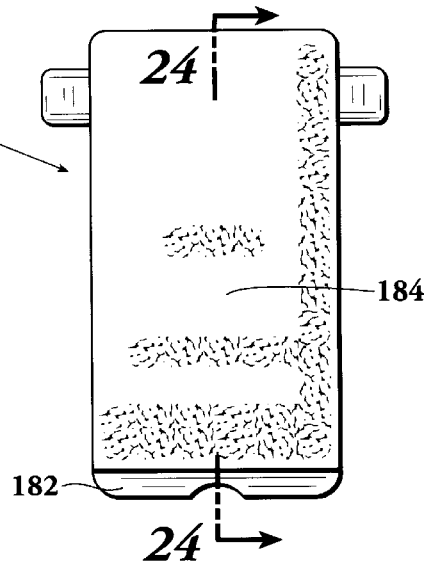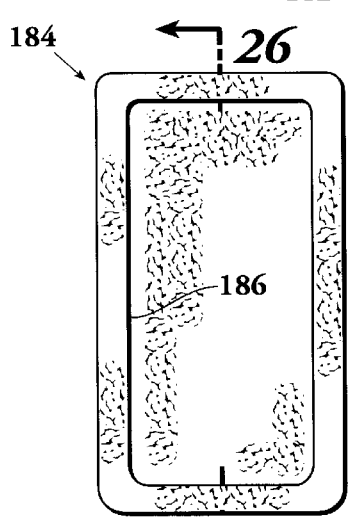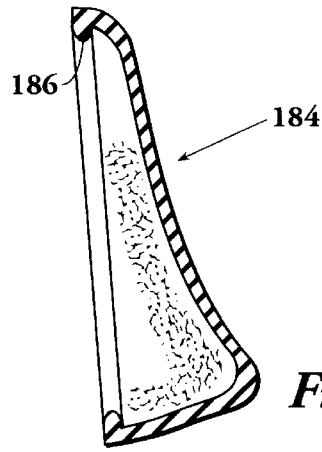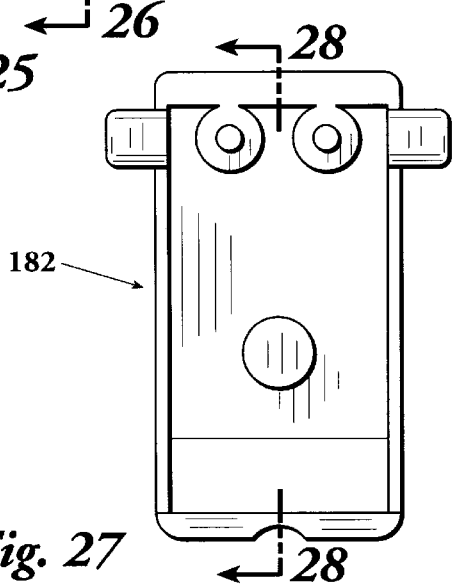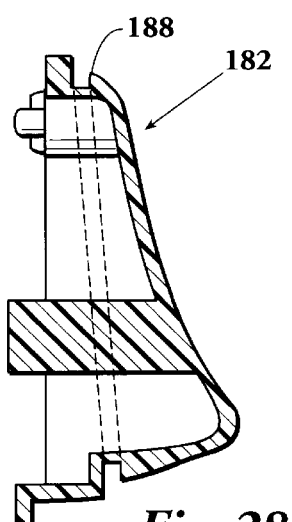

TWO PIECE COVER FOR FISHING REEL

FIELD OF THE INVENTION

The present invention relates to fishing reel covers for fishing reels. More particularly, but not by way of limitation, the present invention relates to fishing reel covers for spincast fishing reels.

BACKGROUND OF THE INVENTION

Spincast reels are well know in the art. A spincast reel will typically include: a central body or frame; a front cover positionable over at least the front face of the frame and having a tapered forward wall; a back cover positionable over at least the back face of the frame; a casting button operably projecting from the back cover; and a crank handle extending from the side of the fishing reel. Most of the reel's operating structures and operating mechanisms are either mounted on, formed on, or mounted through the frame. As discussed hereinbelow, the crank handle is operable for winding a fishing line around a line spool contained within the spincast reel. The line spool is typically mounted on a spool hub projecting forwardly from the front of the frame.

A spincast reel will also include a foot structure for securing the reel on a fishing rod. The foot structure typically extends from either the bottom of the frame or the bottom of the back cover. Spincast reels having the foot extending from the bottom of the back cover are typically constructed such that, when the reel is assembled, the frame is almost completely housed within the front and back covers.

The operating structures and mechanisms contained in a spincast reel typically include: an elongate, main shaft slidably and rotatably extending through the frame and through the spool hub; a spinnerhead secured to the forward end of the main shaft; a pinion gear positioned around the main shaft; a crankshaft extending from the crank handle into the side of the reel and through a crankshaft boss provided on the rearward face of the frame; a drive gear (e.g., a face gear) secured on the interior end of the crankshaft; an anti-reverse mechanism (e.g., a ratchet/pawl-type mechanism) associated with the crankshaft for preventing reverse rotation of the crank handle and crankshaft; and an adjustable drag system.

The pinion gear is typically retained in the reel adjacent the rear face of the frame. The pinion gear is keyed on the main shaft for imparting rotational movement to the main shaft while allowing the shaft to slide longitudinally through the frame. The crankshaft drive gear operably engages the pinion gear such that rotational movement is imparted to the main shaft by turning the crank handle.

When an excessive pulling force is applied to the fishing line, the drag system counteracts the reels's anti-reverse mechanism to payout a sufficient amount of additional fishing line to prevent the line from breaking. Most drag systems function to allow either (a) an adjustable degree of rotational slippage of the line spool about the spool hub or (b) an adjustable degree of rotational slippage of the drive gear about the crankshaft. A typical drag system will also include an external adjustment means comprising either a finger-operated drag wheel projecting from the reel housing or a star-shaped dial operably secured adjacent the crank handle on the exterior end of the crankshaft.

The spinnerhead attached to the forward end of the main shaft is operable for winding the fishing line on the reel spool. While winding, the spinnerhead is operably positioned over the spool. When the user turns the crank handle, the rotational movement of the handle is mechanically transferred to the spinnerhead by means of the drive gear, the pinion gear, and the main shaft. The spinnerhead will typically include means for holding and positioning the fishing line such that, as the spinnerhead rotates, the spinnerhead raps the line around the spool. Such means will commonly consist of either (a) a set of line-grasping notches formed in the rearward edge of the spinnerhead or (b) a spring-loaded pickup pin projecting laterally through the spinnerhead side wall.

A spincast reel will also typically include means for biasing the main shaft rearwardly toward engagement with the casting button. Such means commonly consists of a spring positioned around the rearward portion of the main shaft. The spring is typically attached to or retained by the rearward end of the main shaft such that the spring also holds the pinion gear against the reel frame.

When casting with a spincast reel, the user initially presses and holds the thumb button whereby the main shaft and the spinnerhead move forward and the spinnerhead clamps the fishing line against the tapered forward wall of the front cover. The line is thus prevented from moving outward (i.e., paying out) during the power portion of the casting motion. The forward movement of the main shaft and spinnerhead also typically activates a locking mechanism which (a) limits the rearward movement of the spinnerhead such that the spinnerhead is prevented from returning to its winding position and (b) disengages the line-grasping mechanism.

At the end of the casting motion, the user releases the thumb button and thereby allows the shaft spring to move the main shaft and the spinnerhead rearwardly such that the fishing line is no longer clamped against the tapered forward wall of the front cover. With the line thus released and the spinnerhead prevented from grasping or otherwise engaging the fishing line, the line flows freely over the forward end of the line spool and through the line opening provided in the forward end of the front cover.

After casting, the user returns the spinnerhead and the line-grasping mechanism to their winding positions by simply turning the crank handle. One or more cam lobes or other release mechanisms are typically provided on the frame or elsewhere in the reel for releasing the spinnerhead locking mechanism in response to rotational movement of the spinnerhead.

A casting button 1 of the type heretofore used in the art is depicted in FIGS. 18 and 19. Casting button 1 includes: a pair of upper, opposing pivot pins 3 projecting outwardly from the sides of button 1; an exterior contacting surface 5 commonly having a curved shape roughly corresponding to the shape of a user's thumb; and a forwardly projecting interior structure 7 configured for operatively engaging (i.e., pushing) the rearward end of the main shaft. The shaft spring biases the main shaft toward operative contact with thumb button interior structure 7. Pivot pins 3 are pivotably retained in apertures, bosses, C-shaped slots 9, or other structures provided within or on the rear cover 11 of the spincast reel.

Casting buttons of the type heretofore used in the art have significant shortcomings. In order to provide sufficient durability and ensure that they retain their shape during use, prior art buttons have typically been formed from metal or hard plastic. Unfortunately, these materials can rattle against the back cover. Such rattling is viewed by some as reflecting low quality. The hard exterior surface presented by the prior art button can also be quite slippery, particularly when wet.

Thus, the user's thumb may not adequately engage the casting button or may slip off of the button during use. Additionally, unless the exterior shape of the hard, prior art button ideally matches the shape of the user's thumb, the prior art button may not provide the comfort and "feel" desired by active users.

A need also exists for a means of safely retaining a lure or other hook-containing structure which happens to be attached to the end of the user's line. When carrying, transporting, or temporarily storing an assembled rod and reel, a freely dangling lure can easily become caught or entangled. Moreover, a freely dangling lure poses a serious safety hazard.

Heretofore, when carrying, transporting, or temporarily storing an assembled rod and reel having an attached lure, the user has typically hooked the lure onto one of the line guides provided on the rod. After hooking the lure onto the line guide, the user typically turns the crank handle until the fishing line is taut. Thus, the line and the lure are securely retained and prevented from becoming entangled. Unfortunately, however, securing the line and lure in this manner exerts a substantial amount of stress on the line guide and can bend, break, or otherwise damage the line guide or pull the line guide from the rod.

SUMMARY OF THE INVENTION

The present invention satisfies the needs and alleviates the problems discussed above. The present invention provides soft, flexible, slip-resistant casting button structures which conform to the shape of the user's thumb. The present invention also provides casting button structures which will not rattle. The present invention further provides a safe, sturdy, reliable structure for temporarily retaining a fishing lure. The inventive retaining structure preferably extends from the exterior of the reel and thus prevents damage to the user's fishing rod and fishing line.

In addition to the benefits and advantages just mentioned, the present invention provides a novel, two-piece, front cover for a fishing reel. The novel front cover includes an inventive snap-on ring having openings therein which reveal the color and/or design of an underlying front cover cone piece. The openings provided in the snap on ring also create a highly effective gripping structure for use in removing the front cover from the reel.

In one aspect, the present invention provides a fishing apparatus comprising a fishing reel having retaining means provided thereon for retaining a hook structure. In one embodiment, the fishing reel includes a reel body and the retaining means is provided on the reel body.

In another aspect, the present invention provides a retainer for retaining a hook structure. The retainer is useful for retaining a hook structure attached to a fishing line extending from a fishing reel. The inventive retainer comprises an eyelet provided on the exterior of the fishing reel. The eyelet is preferably integrally formed on the exterior of the fishing reel.

As used herein and in the claims, the term "hook structure" refers generally to any fishing structure (e.g., a fishing hook, a fishing lure, etc.) having a hook for catching fish.

In another aspect, the present invention provides a fishing reel cover comprising (a) a first cover piece having an exterior and (b) a second cover piece having a second piece wall. The second piece wall has at least one aperture provided therethrough. The second cover piece is positionable on the first cover piece such that the exterior of the first cover piece is visible through the second piece aperture. The second cover piece preferably includes a plurality of apertures through which the exterior of the first cover piece is visible. Most preferably, the second cover piece includes a plurality of such apertures arranged so that the apertures form a gripping structure.

In another aspect, the present invention provides a casting actuator for a fishing reel. The inventive casting actuator comprises: a collar; a lever pivotably extending from the collar; and a flexible cover extending from the collar over at least a portion of the lever. The flexible cover provides a contacting surface on the lever for contacting by a user when actuating the lever. The inventive casting actuator preferably also comprises a hinge connecting the lever to the collar. The hinge is most preferably a living hinge which is integrally formed with the lever and the collar. In addition, the inventive casting actuator preferably includes engaging means, integrally formed with the lever, for operably engaging a main shaft of the fishing reel.

In another aspect, the inventive casting actuator comprises: an actuating lever; a support structure; and a resilient hinge connecting the actuating lever to the support structure. The actuating lever and the resilient hinge are integrally formed with the support structure. Preferably, the actuating lever, the support structure, and the resilient hinge constitute a unitary molded structure.

The present invention also provides a method for forming the inventive casting actuator. The inventive method comprises the step of placing a first material in a mold to form a unitary, molded structure. The resulting unitary, molded structure comprises: an actuating lever; a support structure; and a resilient hinge connecting the actuating lever to the support structure. The resilient hinge is preferably a living hinge. The inventive method preferably also comprises the step, while the first material is present in the mold, of placing a second material in the mold to form a flexible cover extending from the support structure over at least a portion of the actuating lever. The flexible cover is preferably formed such that the cover provides a contacting surface on the lever for contacting by a user when actuating the lever.

In another aspect, the present invention provides a fishing reel casting actuator comprising an engaging structure. The engaging structure includes a convex surface for operably contacting the end of the main shaft of the fishing reel. The engaging structure preferably extends from a contacting structure. The contacting structure is operable for contacting by a user's thumb for operating the inventive casting actuator.

In another aspect, the present invention provides a fishing reel casting actuator comprising a thumb button having a flexible contacting surface for contacting by a user's thumb. The thumb button is formed from a material effective for flexing to accommodate the user's thumb when the user's thumb applies an actuating force to the contact surface. The material is also preferably effective such that, while flexing in response to the actuating force applied by the user's thumb, the thumb button retains its original shape to a sufficient degree to allow continued operation.

In yet another aspect, the present invention provides a fishing reel casting actuator comprising (a) a thumb button and (b) a flexible covering positioned on the thumb button such that the flexible covering provides a contacting surface on the thumb button for contacting by the user when operating the button. The thumb button is preferably a hard, substantially inflexible structure. The inventive casting actuator preferably also comprises holding means for holding the flexible covering on the substantially inflexible thumb button.

Further objects, features, and advantages of the present invention will be apparent to those skilled in the art upon examining the accompanying drawings and upon reading the following description of the preferred embodiments.

BRIEF DESCRIPTION OF THE DRAWINGS

FIG. 7 provides an elevational view, as seen from perspective 7—7 shown in FIG. 6, of an embodiment 4 of a casting actuator assembly provided by the present invention.

FIG. 8 provides a cutaway, elevational side view of actuator assembly 4 as seen from perspective 8—8 shown in FIG. 7.

FIG. 9 provides a second cutaway, elevational side view of actuator assembly 4 as seen from perspective 9—9, shown in FIG. 7.

FIG. 10 provides a cutaway, elevational side view of actuator assembly 4 showing the flexing operation of the inventive actuator assembly.

FIG. 15 provides an exploded view of an embodiment 10 of the front cover assembly provided by the present invention.

FIG. 17 provides an elevational, cutaway side view of a retainer ring 44 used in inventive actuator assembly 4.

FIG. 23 provides an elevational back (outer) view of an embodiment 180 of the inventive thumb button assembly.

FIG. 24 provides a cutaway side view of assembly 180 as seen from perspective 24—24 shown in FIG. 23.

FIG. 25 provides an elevational front (interior) view of a flexible pad 184 employed in inventive assembly 180.

FIG. 26 provides a cutaway side view of flexible pad 184 as seen from perspective 26—26 shown in FIG. 25.

FIG. 27 provides an elevational front (interior) view of a button structure 182 employed in inventive assembly 180.

FIG. 28 provides a cutaway side view of button structure 182 as seen from perspective 28—28 shown in FIG. 27.

DESCRIPTION OF THE PREFERRED EMBODIMENTS

Figure 1:
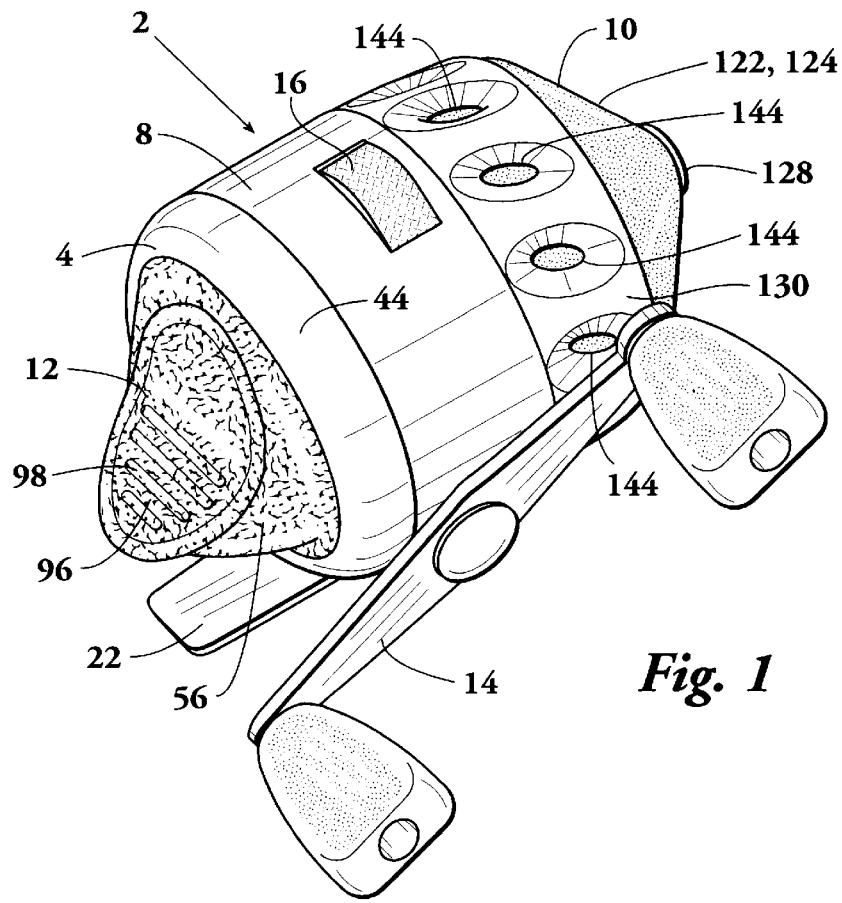
FIG. 1 provides a perspective view of a spincast reel 2 provided by the present invention.
Figure 2:
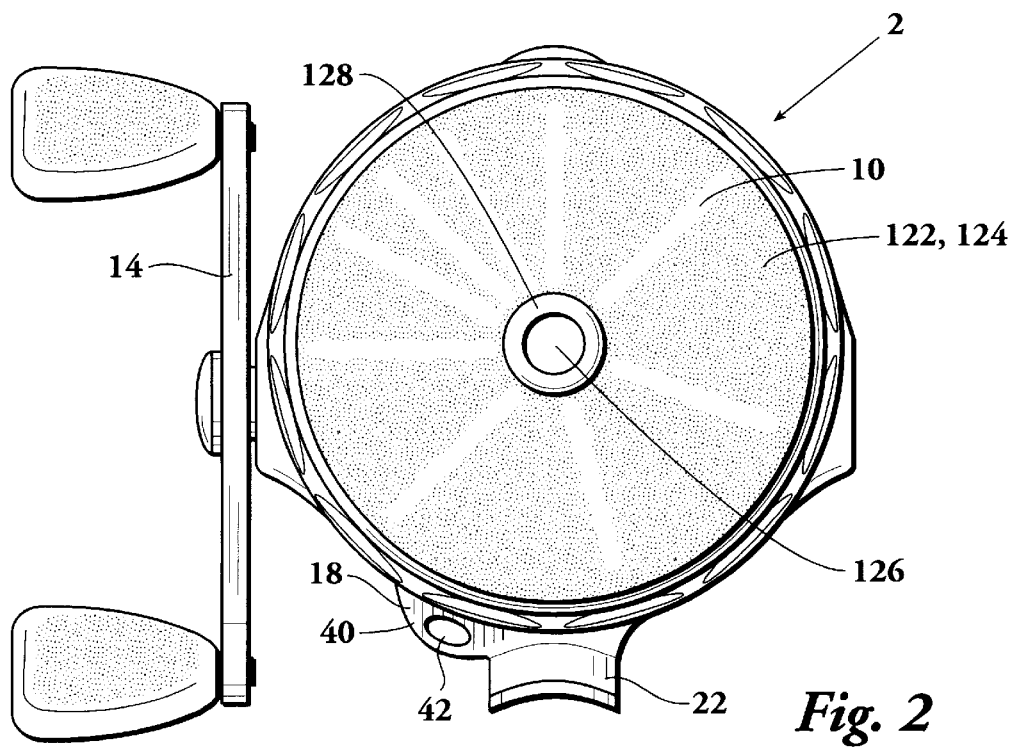
FIG. 2 provides a front, elevational view of reel 2.
Figure 5:
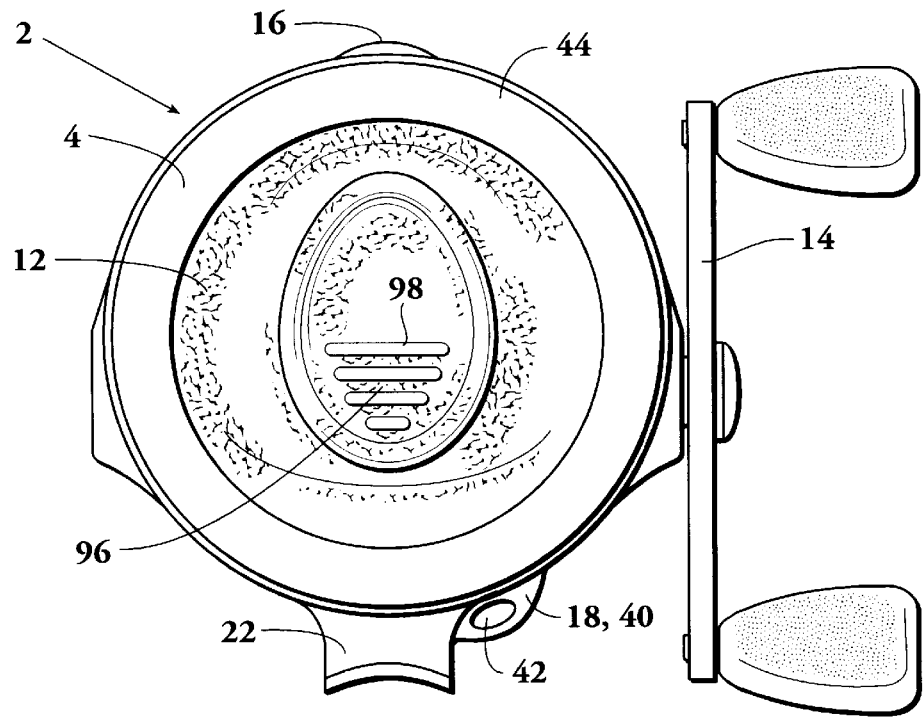
FIG. 5 provides an elevational rear view of reel 2.
Figure 3:
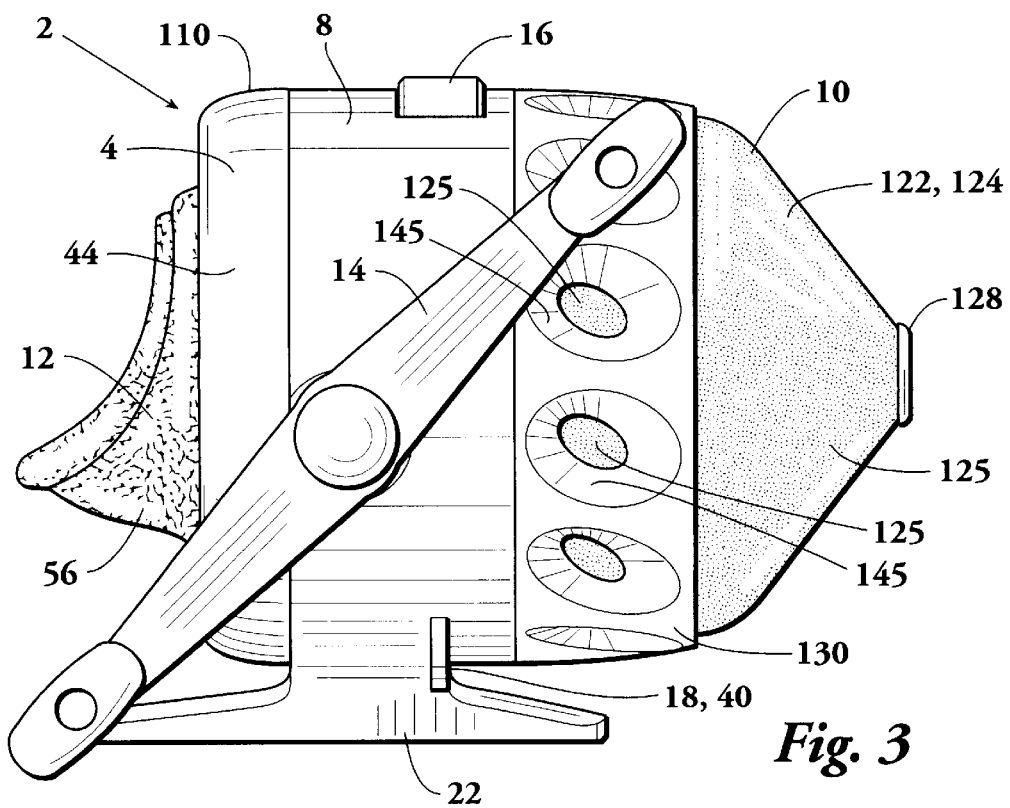
FIG. 3 provides a right-side elevational view of reel 2.
Figure 4:
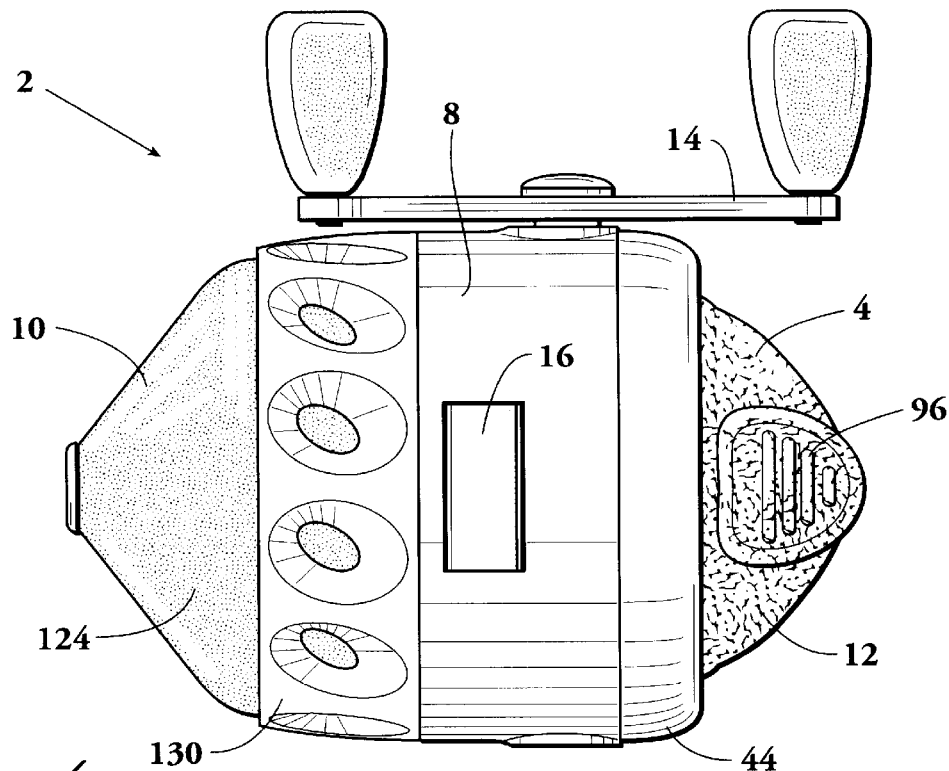
FIG. 4 provides a top view of reel 2.
Figure 6:
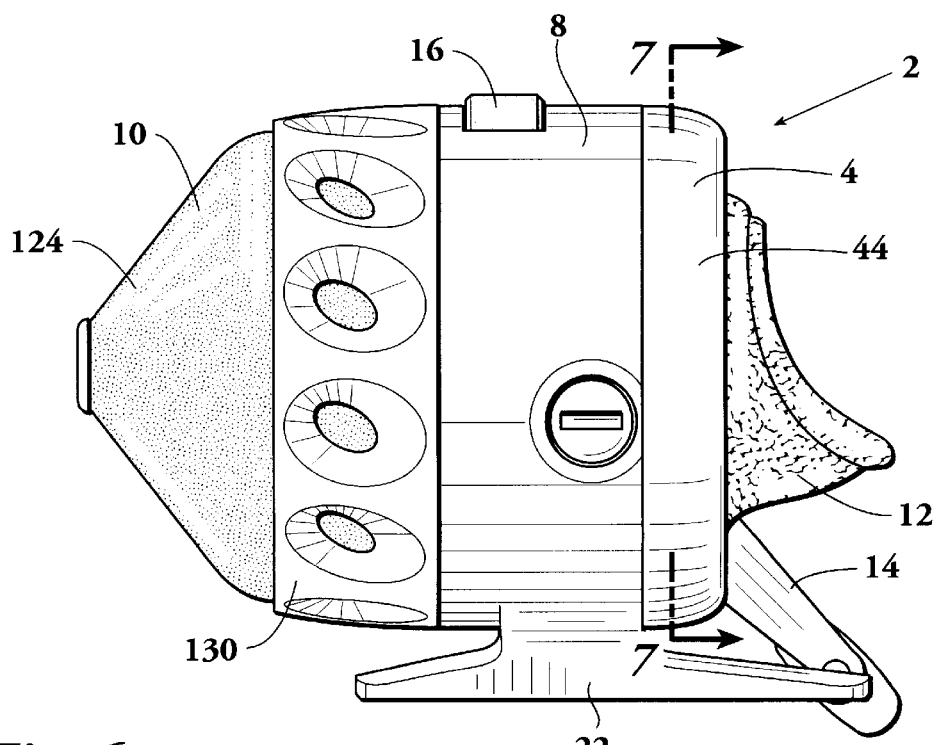
FIG. 6 provides an elevational left-side view of reel 2.

An embodiment 2 of a spincast reel provided by the present invention is depicted in FIGS. 1–5 and 16. Reel 2 comprises: a body structure 8; an inventive rear cover assembly 4; an inventive front cover assembly 10; an inventive casting actuator 12 included in rear cover assembly 4; a crank handle 14 rotatably mounted on the side of body 8; a drag wheel 16, operably projecting through the top of body 8, for adjusting the reel's internal drag system; and an inventive hook-retaining feature 18 provided on the exterior of reel 2. As will be understood by those skilled in the art, the remaining internal operating structures and mechanisms employed in reel 2 can be the same as those used in substantially any spincast reel.

As depicted in FIGS. 3, 4, 6, 11, 12, 13, and 14, body 8 comprises: a frame portion 20 on and/or through which most of the reel's operating structures and/or mechanisms are mounted; a foot structure 22, extending from the bottom of frame 20, for mounting reel 2 on a fishing rod; a spool hub 24, projecting from the front of frame 20, on which a line spool (not shown) is mounted; an elongate bore 26 extending through frame 20 and hub 24 for slidably and rotatably holding the main shaft 6 of reel 2; an aperture 28 provided through the side of frame 20 for receiving the crankshaft 30 of reel 2; and a crankshaft support structure 32, projecting from the rear of frame 20, for rotatably holding crankshaft 30. Other features shown in FIGS. 11 and 12 include a pinion gear 34 and a biasing spring 36, each positioned on main shaft 6, and a drive gear 38 positioned on crankshaft 30. Crank handle 14 is secured to the exterior end of crankshaft 30. Drive gear 38 operably engages pinion gear 34 such that the user can rotate main shaft 6 by turning crank handle 14.

As best seen in FIGS. 2, 3, 5, 13, and 14, hook-retaining feature 18 is preferably an eyelet-type structure comprising an eyelet body 40 having an aperture 42 extending therethrough. So long as retaining feature 18 and any hook structure retained thereby do not interfere with the operation or mounting of reel 2, retaining feature 18 can be positioned substantially anywhere on the exterior of reel 2.

Retaining feature 18 is preferably positioned adjacent foot structure 22. Retaining feature 18 can be secured or formed on reel 2 by any means enabling retaining feature 18 to withstand the stress encountered when feature 18 is used for retaining a hook structure. In the embodiment depicted in FIGS. 2, 3, 5, 13, and 14, retaining feature 18 is integrally molded with the body structure 8 of reel 2. However, when used on a spincast reel of the type having a foot structure extending from the bottom of the reel's back cover, retaining feature 18 will preferably be integrally molded with the back cover.

Hook-retaining feature 18 is particularly well suited for retaining an attached hook structure while carrying, transporting, and/or temporarily storing an assembled rod and reel. When using retaining feature 18, the hook portion of the hook structure is placed through aperture 42 such that the hook structure is retained by eyelet body 40. Crank handle 14 is then turned until the fishing line is taut. When thus snugly retained, the hook structure and line are prevented from becoming entangled and from causing injury.

Figure 16:
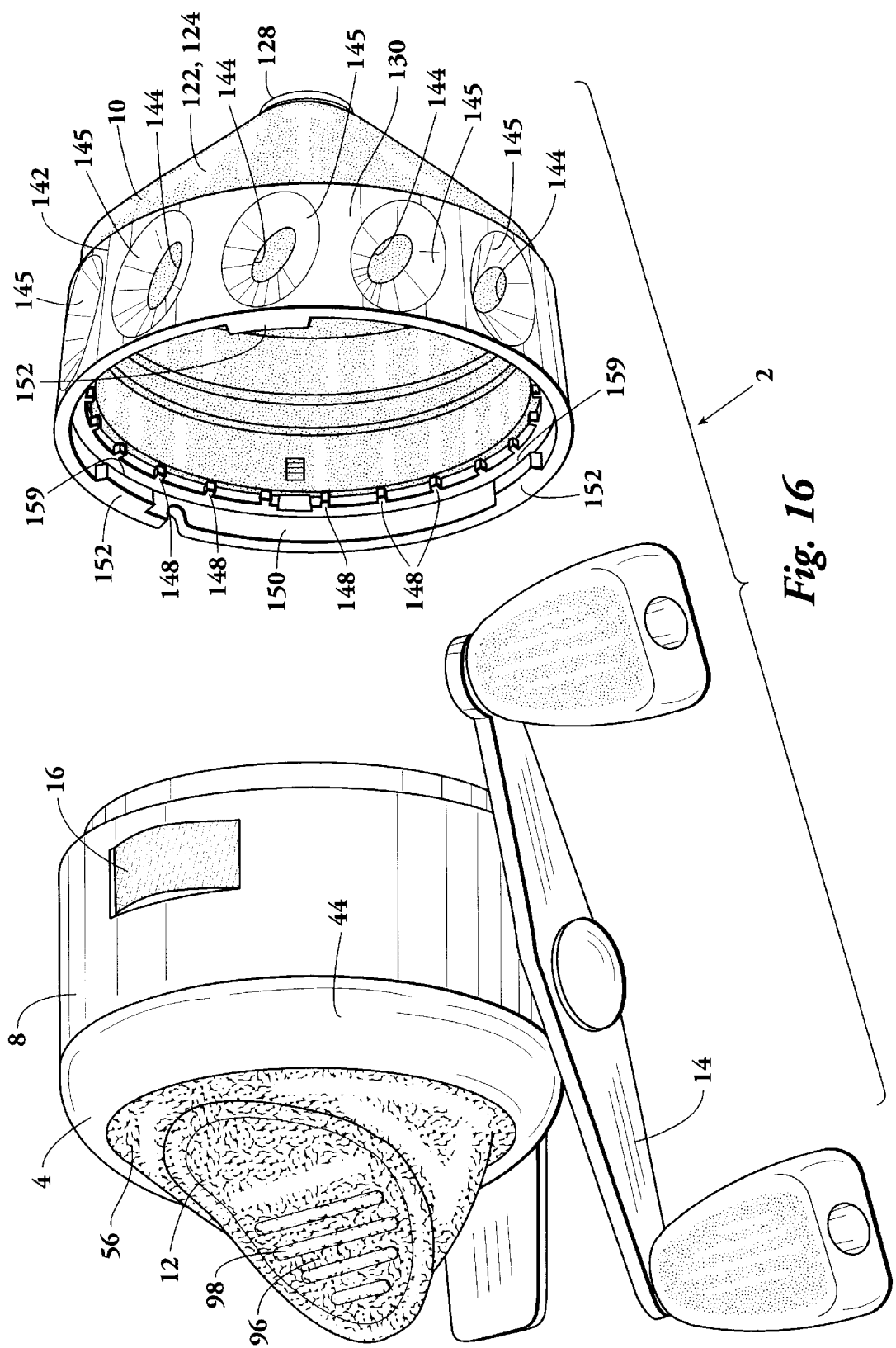
FIG. 16 provides a partially exploded, perspective view of reel 2.
Figure 19:
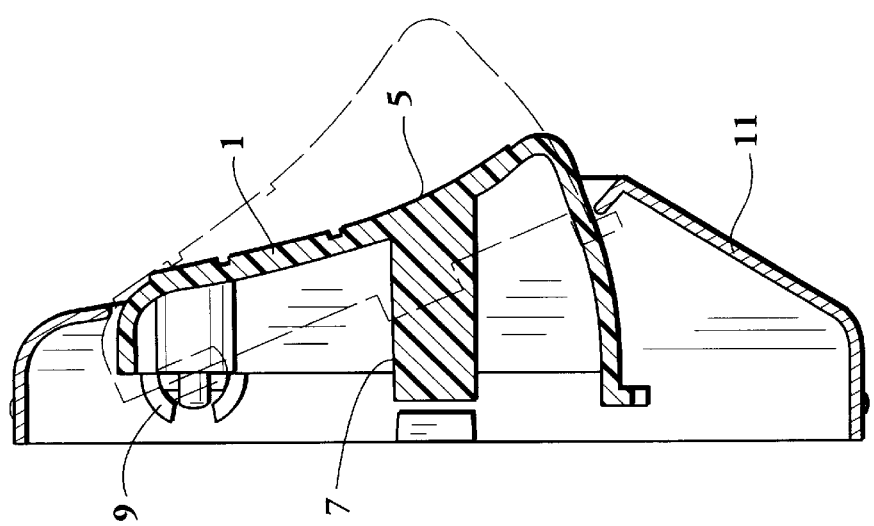
FIG. 19 provides an elevational, cutaway side view of the prior art actuator assembly.
Figure 18:
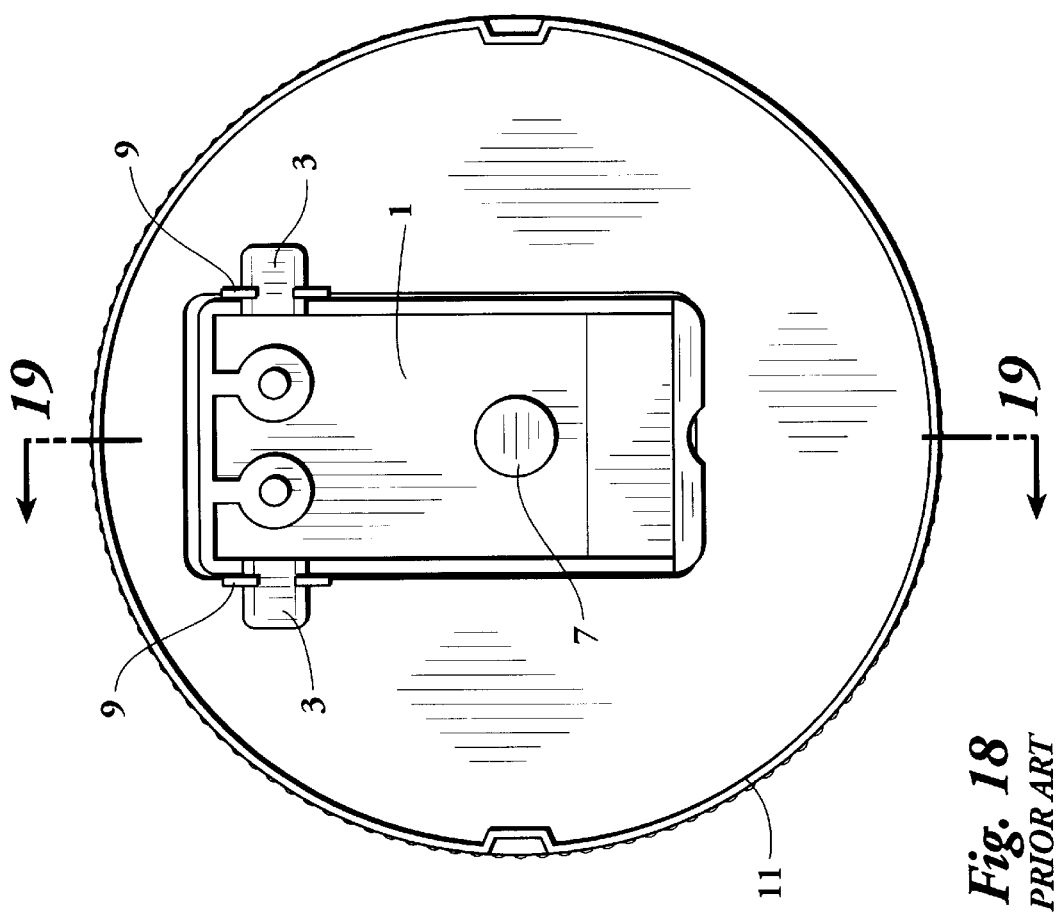
FIG. 18 provides an elevational front (interior) view of a prior art casting actuator assembly.

An embodiment 10 of the front cover assembly provided by the present invention is depicted in FIGS. 15 and 16. Front cover 10 is preferably a "two-piece" type cover comprising: a cone piece 124 having a circular line opening 126 formed in the forward end thereof; a standard, smooth line guide which snaps into aperture 126 and protects the fishing line from abrasion; and a ring piece 130.

As is typical of two-piece-type front covers, cone piece 124 preferably comprises a tapered (e.g., substantially frusto-conical) forward portion 122 and a substantially cylindrical portion 134. Substantially cylindrical portion 134 extends from the rearward end of frusto-conical portion 122 and has a circular rearward edge 136. The entire exterior of cone piece 124 will typically have thereon a visible feature 125 (e.g., a color and/or pattern). Alternatively, different visible features can be provided on the exteriors of tapered portion 122 and substantially cylindrical portion 134. Cone piece 124 also includes a plurality of small tabs 138 projecting outwardly from cylindrical portion 134.

Ring 130 is preferably a snap-on ring comprising: a ring wall 140 having a slightly tapered (e.g., substantially frusto-conical) exterior 142; a plurality of apertures 144 extending through wall 140; a plurality of longitudinal spacing ridges 146 formed on the interior of ring wall 140; a plurality of inwardly projecting retaining tabs 148 formed in a circular pattern around the interior of ring wall 140; a rearwardly projecting attachment collar 150; and a plurality of (preferably three) substantially radial, interior ridges 152 formed in attachment collar 150. Ring 130 is snapped onto cone piece 124 by sliding spacing ridges 146 over cone piece cylindrical portion 134 such that (a) the rearward edge 136 of cone piece 124 abuts ring tabs 148 and (b) cone piece tabs 138 snap into place over shoulders 154 formed in the interior surface of ring wall 140.

Ring 130 preferably covers at least most of the exterior of cone piece cylindrical portion 134. The feature 125 provided on the exterior of cone piece 124 is visible through ring apertures 144. Apertures 144 can be of generally any desired shape, arrangement, or pattern. Apertures 144 are preferably arranged as shown in FIGS. 15 and 16 to provide a sturdy, reliable gripping surface useful for removing front cover assembly 10 from, and reattaching assembly 10 to, reel body 8. Apertures 144 can also include one or more surface characteristics (e.g., concave indentations 145 surrounding the apertures) providing enhanced grippability.

A plurality of notches 155 and associated grooves 156 are spaced around the forward end of real body 8 for removably attaching front cover assembly 10 to reel body 8. Front cover 10 is attached to body 8 by (a) placing ring interior ridges 152 in notches 155 and then (b) rotating cover 10 with respect to body 8 such that ridges 152 are received in grooves 156. The surfaces 157 provided in grooves 156 and the surfaces 159 provided on ring ridges 152 are preferably sloped whereby, as surfaces 159 slidingly contact surfaces 157 during the rotation of front cover 10, front cover 10 is pulled into snug engagement with reel body 8.

As will be understood by those skilled in the art, ring 130 can alternatively include threads or generally any other structure used for attaching reel covers. Additionally, depending primarily on the particular type of frame arrangement used, inventive front cover assembly 10 can alternatively be attached to either the reel's back cover or to any other structure to which a spincast reel front cover is commonly attached.

The inventive rear cover assembly 4 comprises casting actuator 12 and a retaining ring 44. Retaining ring 44 is positioned over the periphery of actuator 12 and assists in retaining actuator 12 on body 8.

Inventive casting actuator 12 comprises: a support structure 46; a thumb lever 48; a resilient hinge 50 which pivotably connects thumb lever 48 to support structure 46; an engaging structure 52 projecting from the interior side 54 of thumb lever 48; and a flexible covering secured to support structure 46 and extending over thumb lever 48. Hinge 50 is preferably a living (springy) hinge. The outer side 58 of thumb lever 48 is shaped to generally correspond to the contour of a user's thumb. Support structure 46 is preferably a ring-like collar comprising: a rounded outer surface 60; a flat, radial forward surface 62; a plurality of (preferably at least three) notches 64 formed in the outer edge of collar 46; a plurality of curved ridges 66 projecting from forward surface 62; a pair of chamfers 68 projecting forwardly from collar 46; a rectangular mounting peg 70 projecting from forward surface 62; a pair of circular cavities 72 formed in forward surface 62 on either side of mounting peg 70; and an inner groove 74 for receiving and retaining the edge 76 of flexible cover 56.

Reel body 8 includes a rearwardly projecting, substantially circular collar 78 to which actuator collar 46 is removably secured. Actuator collar 46 is preferably secured to body collar 78 by (a) positioning mounting peg 70 in a rectangular cavity 82 provided at the top of body collar 78, (b) positioning circular pegs 84 extending from the top of body collar 78 in circular cavities 5 72, (c) positioning curved ridges 66 inside body collar 78, and (d) inserting chamfers 68 in body collar 78 such that chamfers 68 latch within grooves 86 formed through the wall of body collar 78. Mounting peg 70 and circular pegs 84 assist in preventing rotational movement of casting actuator 12 and operate to guide casting actuator 12 into proper engagement with body collar 78.

Support collar 46, hinge 50, thumb lever 48, and engaging structure 52 preferably constitute a unitary, molded structure 88. Unitary structure 88 is preferably formed from a hard material having sufficient flexibility and springiness to provide living hinge 50 and to allow chamfers 68 to be latched in, and removed from, grooves 86. For example, as will be understood by those skilled in the art, unitary structure 88 can be formed from an olefinic polymer material. Unitary structure 88 is preferably formed from polypropylene. Unitary structure 88 is most preferably formed from a molding composition comprising 80 parts by weight of polypropylene and 20 parts by weight talc filler.

The flexible cover 56 extending from collar groove 74 covers the exterior surface of hinge 50 and covers at least a substantial portion of the outer side 58 of thumb lever 48. Cover 56 is preferably formed from a highly flexible polymer material (e.g., an injection molded elastomer or an ABS (acrylonitrile butadiene styrene)/rubber blend), or from some other highly flexible material, such that (a) cover 56 freely flexes at points 90, 92, and 94 and thus does not interfere with the pivoting operation of thumb lever 48 and (b) cover 56 provides on thumb lever 48 a comfortable contacting surface 96 which flexes slightly to accommodate the user's thumb. The flexible material used in forming cover 56 preferably also has sufficient tack to impart a substantial degree of slip resistance to contacting surface 96. Ridges 98 or other features can be formed on contacting surface 96 to provide further slip resistance.

One material particularly well suited for use in forming cover 56 is MONOPRENE MP-2720 available from Quality Service Technology, St. Albens, Vt. MONOPRENE MP-2720 has a Shore A hardness rating of 23.

Casting actuator 12 is preferably formed by a co-molding process employing a mold having exchangeable pieces for forming two interrelated mold cavities. As will be understood by those skilled in the art, the co-molding process will preferably comprise the steps of: (a) injecting a suitable first material into the mold to form unitary molded structure 88; (b) exchanging the exchangeable pieces of the mold to thereby form the second mold cavity; and then (c) injecting a suitable second material into the second mold cavity to form flexible cover 56. The second material is injected into the second cavity at a time when the first material is still present in the mold. Thus, cover 56 bonds to collar groove 74, hinge 50, and thumb lever 48. To provide optimum bonding between flexible cover 56 and unitary structure 88, the second material is preferably injected into the mold before the first material has fully cooled.

Flexible cover 56 is preferably formed such that cover 56 and thumb lever 48 completely cover the opening 100 extending through collar 46. Due to the unitary nature of structure 88 and cover 56, inventive casting actuator 12 is at least substantially rattle free.

As will be understood by those skilled in the art, the inventive process used for forming casting actuator 12 can be modified to co-mold additional components. Further, if desired, inserts (e.g., a threaded metal collar for use as an alternative means for connecting casting actuator 12 to reel body 8) can be included in the mold. Additionally, lettering, graphics, and/or other features can be formed on contacting surface 96 by, for example, injecting an amount of the first molding material through the second material covering thumb lever 48. As will be understood by those skilled in the art, a hollow passageway 53 can optionally be formed through engaging structure 52 to allow injection of the first material through the second material.

Figure 11:
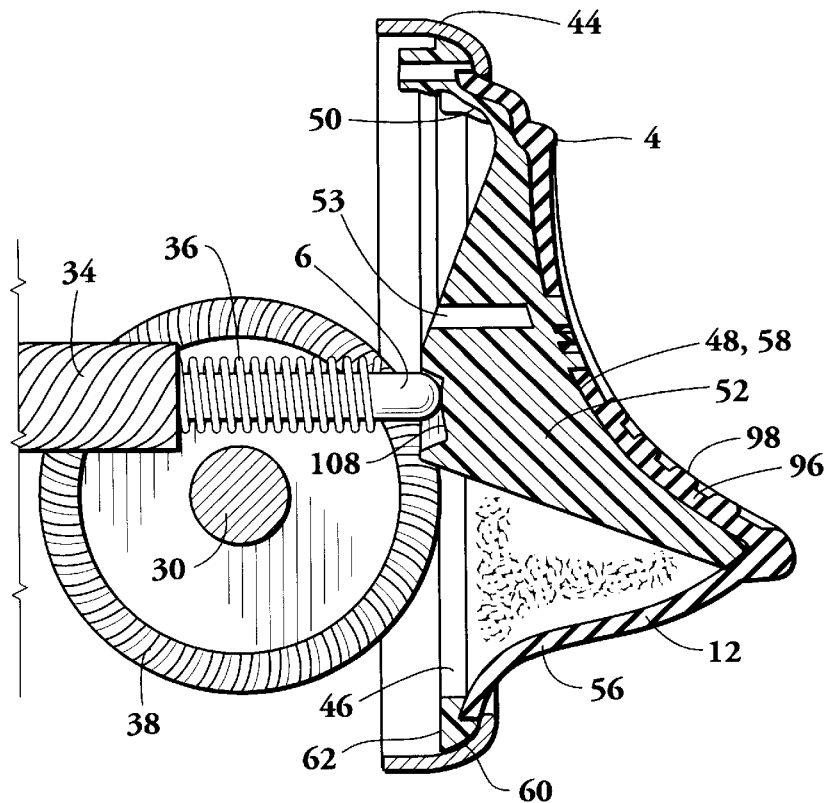
FIGS. 11 and 12 provide cutaway, elevational side views of actuator assembly 4 showing the interaction of assembly 4 with the main shaft 6 of reel 2.
Figure 12:
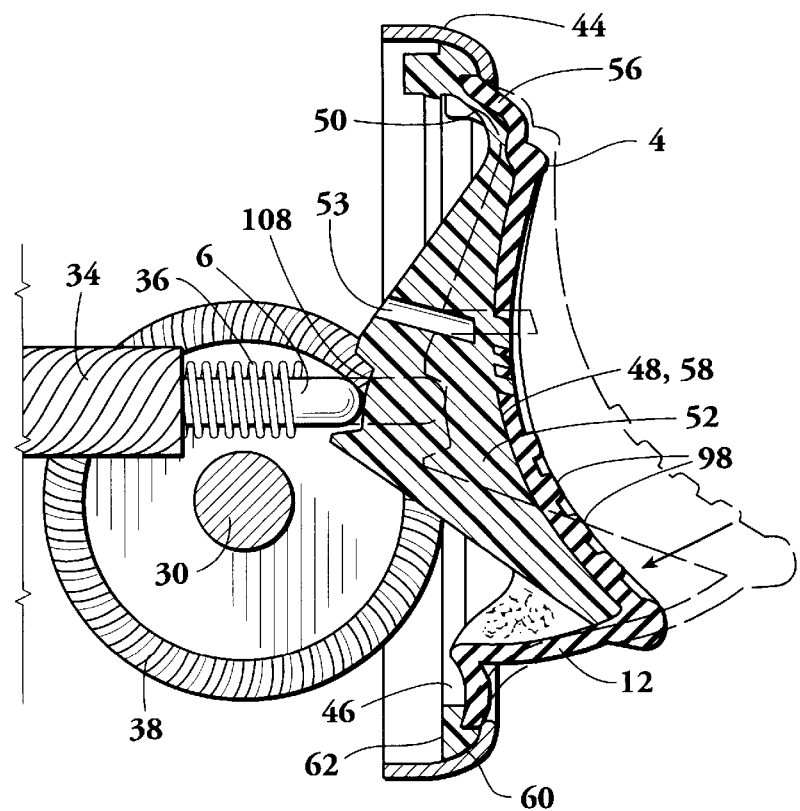
Figure 14:
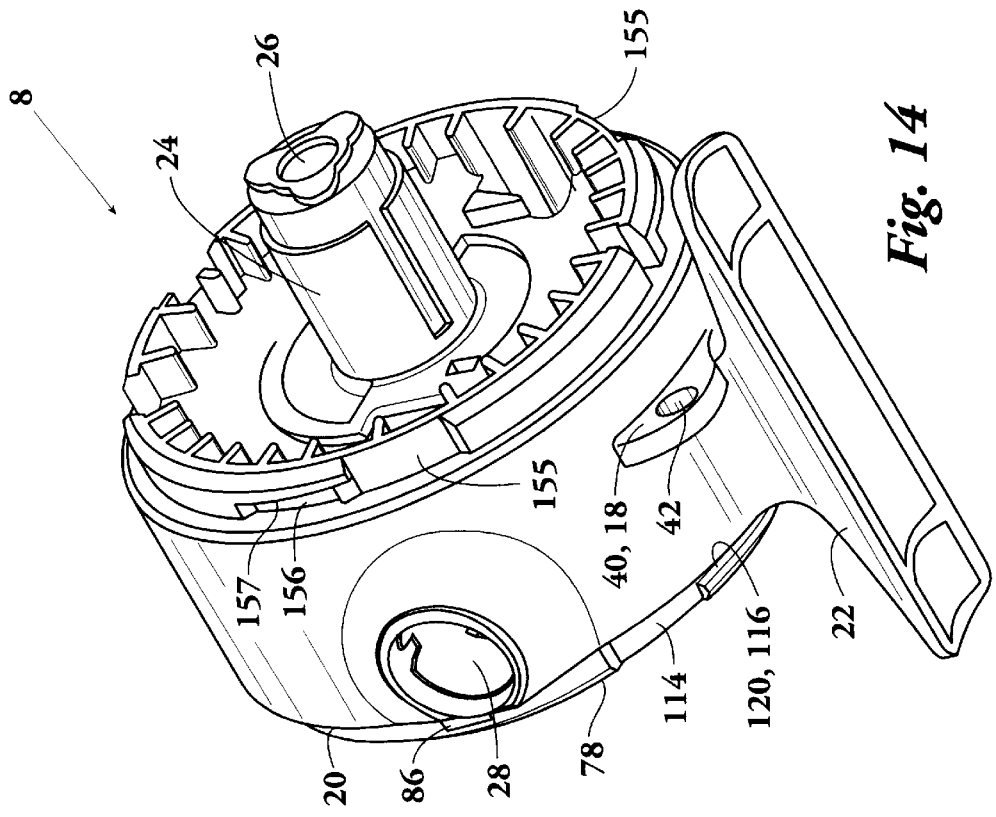
FIG. 14 provides a perspective view of body 8.
Figure 13:
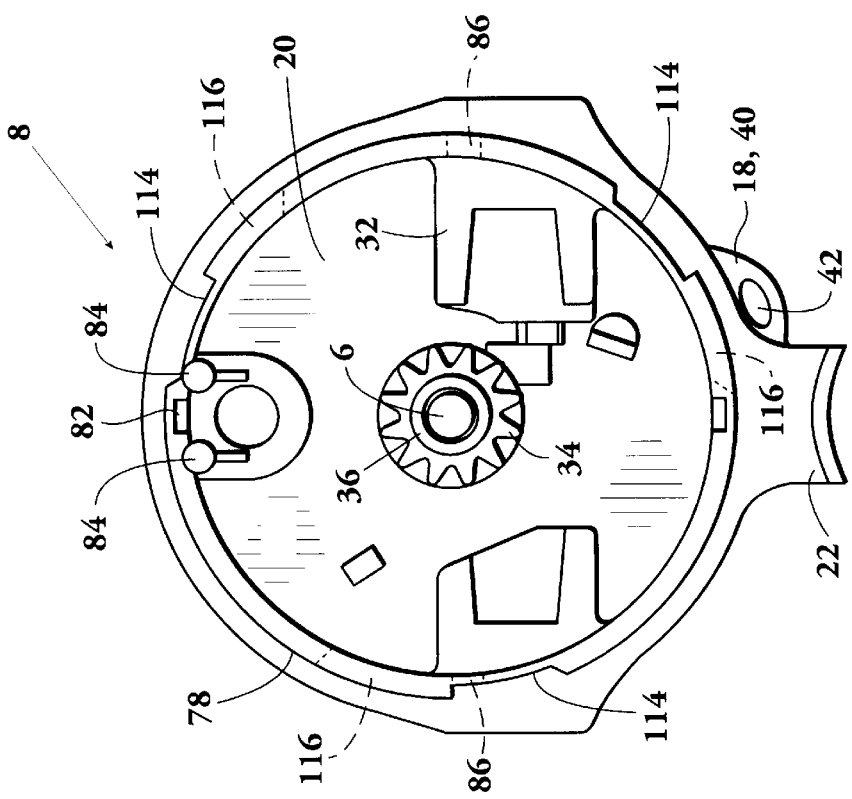
FIG. 13 provides an elevational rear view of a body structure 8 used in reel 2.

The engaging structure 52 formed on the inside surface of thumb lever 54 can generally be any type of structure capable of operatively engaging the main shaft 6 of reel 2. Engaging structure 52 is preferably a boss having a cup 102 formed on the end thereof. Cup 102 preferably includes outwardly tapered upper and lower walls 104 and 106 and a convex, vertically oriented interior wall 108. The end of main shaft 6 is received in cup 102 such that convex interior wall 108 operatively engages shaft 6. FIGS. 11 and 12 illustrate that, as the user pivots thumb lever 48 inwardly, the point at which the end of shaft 6 contacts engaging structure 52 shifts downwardly on convex wall 108 in a manner such that the directional force applied by engaging structure 52 desirably remains substantially collinear with the longitudinal axis of main shaft 6.

Actuator retaining ring 44 assists in retaining casting actuator 12 on body collar 78. Retaining ring 44 includes a rounded end wall 110 and a plurality of (preferably three) substantially radial, interior ridges 112. With casting actuator 12 secured by chamfers 68 on body collar 78, actuator retaining ring 44 is positioned over actuator 12 such that (a) the rounded end wall 110 of retaining ring 44 contacts and holds the rounded outer surface 60 of collar 46 and (b) ridges 112 are received through collar notches 64 and in notches 114 formed in body collar 78. With ridges 112 received in body notches 114, retaining ring 44 is then rotated with respect to reel body 8 such that ridges 112 are received in attachment grooves 116 formed in the outer wall of body collar 78. In the same manner as ridges 152 and grooves 156 used for attaching front cover assembly 10 to body 8, retainer ridges 112 and attachment grooves 116 preferably have corresponding sloped surfaces which slidingly contact during the rotation of retaining ring 44 such that retaining ring 44 is pulled and held snugly against reel body 8.

FIGS. 11 and 12 depict the operative interaction of inventive casting actuator 12 with the main shaft 6 of reel 2. Prior to casting, thumb lever 48 and main shaft 6 are in the fully outward positions depicted in FIG. 11. When casting, the user presses and holds the contacting surface 96 of actuator 12. As the user presses contacting surface 96, thumb lever 48 pivots inwardly on hinge 50 in the manner depicted in FIG. 12. As lever 48 pivots inwardly, the convex interior wall 108 of engaging structure 52 imparts a direct actuating force to the end of main shaft 6 such that shaft 6 slides longitudinally forward. As discussed above, the forward longitudinal movement of main shaft 6 causes the spinnerhead (not shown) contained in reel 2 to clamp the fishing line against the tapered forward wall 122 of front cover assembly 10. When at the end of the casting motion the user releases thumb lever 48, living hinge 50 acts as a spring to return thumb lever 48 to the precasting position shown in FIG. 11. Subsequently, when the user turns the crank handle to return the spinnerhead to its winding position, the spring 36 provided on main shaft 6 moves shaft 6 into engaging cup 102 such that the end of shaft 6 again contacts engaging wall 108.

Figure 22:
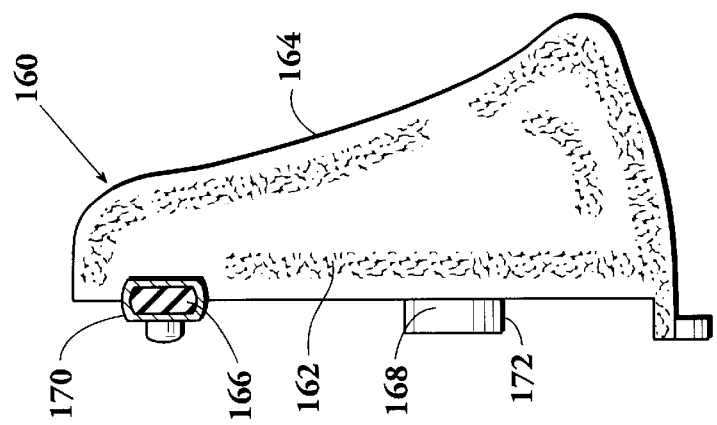
FIG. 22 provides a partially cutaway side view of inventive thumb button 160 as seen from perspective 22—22 shown in FIG. 20.
Figure 21:
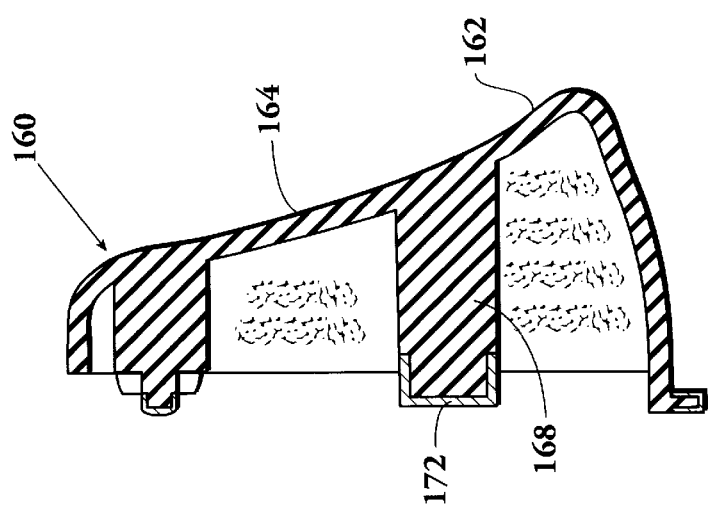
FIG. 21 provides a cutaway side view of inventive thumb button 160 as seen from perspective 21—21 shown in FIG. 20.
Figure 20:
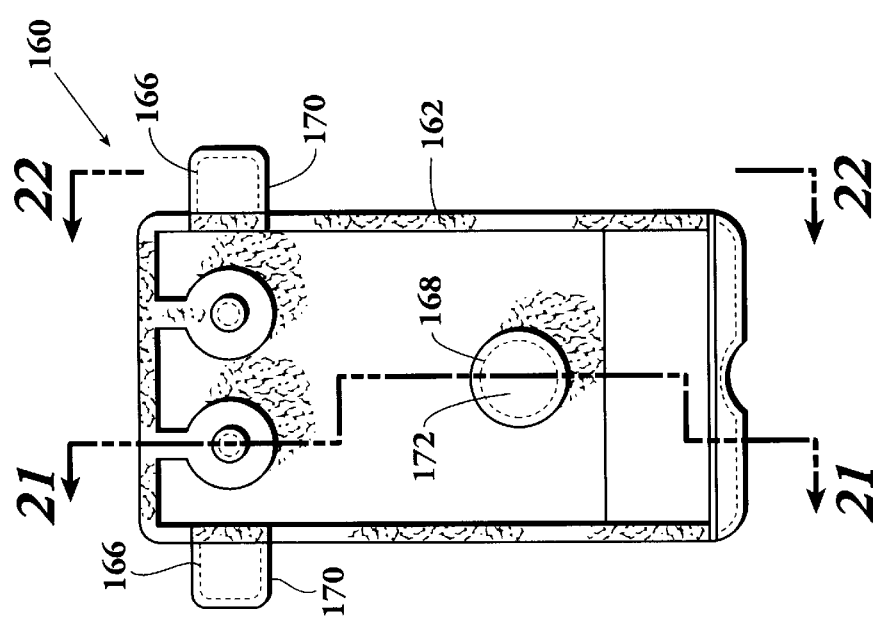
FIG. 20 provides an elevational forward (interior view) of an embodiment 160 of the thumb button provided by the present invention.

Another embodiment 160 of the thumb button provided by the present invention is depicted in FIGS. 20–22. As will be recognized by those skilled in the art, the general structure and shape of thumb button 160 can be the same as substantially any thumb button structure heretofore used in spincasting reels. Thumb button 160 comprises: a body 162 having an outer contacting surface 164; a pair of pivot pins 166, projecting outwardly from the upper portions of the sides of body 162, for pivotably securing button 160 in the back cover of a typical spincast reel; and an actuating post 168, projecting forwardly from body 162, for operably engaging the main shaft of the fishing reel.

In contrast to the spincast thumb buttons heretofore used in the art, inventive thumb button 160 is formed from a material (e.g., a flexible, slip resistant, injection molded elastomer) which (a) flexes to accommodate the user's thumb but (b) has sufficient strength to ensure that the original shape of the thumb button is maintained to a degree sufficient to allow continued operation of the thumb button. To protect the softer material of thumb button 160 from wear, wear-resistant caps (preferably metal or hard plastic caps) 170 and 172 are preferably provided on pivot pins 166 and on the end of actuating post 168.

Another embodiment 180 of the inventive thumb button assembly is depicted in FIGS. 23–28. Thumb button 180 has substantially the same structure as inventive thumb button 160 except that button 180 comprises a hard (preferably smooth) button structure 182 having a flexible contacting pad 184 positioned thereon. For attaching pad 184 to button structure 182, pad 184 includes a flexible lip 186 which is received over a ridge 188 formed around the periphery of hard button structure 182. Pad 184 provides a slip resistant contacting surface which flexes to accommodate the user's thumb. As will be understood by those skilled in the art, pad 184 can be formed from a flexible, injection molded polymer.

Reel body 8 includes a rearwardly projecting, substantially circular collar 78 to which actuator collar 46 is removably secured. Actuator collar 46 is preferably secured to body collar 78 by (a) positioning mounting peg 70 in a rectangular cavity 82 provided at the top of body collar 78, (b) positioning circular pegs 84 extending from the top of body collar 78 in circular cavities 72, (c) positioning curved ridges 66 inside body collar 78, and (d) inserting chamfers 68 in body collar 78 such that chamfers 68 latch within grooves 86 formed through the wall of body collar 78. Mounting peg 70 and circular pegs 84 assist in preventing rotational movement of casting actuator 12 and operate to guide casting actuator 12 into proper engagement with body collar 78.

Support collar 46, hinge 50, thumb lever 48, and engaging structure 52 preferably constitute a unitary, molded structure 88. Unitary structure 88 is preferably formed from a hard material having sufficient flexibility and springiness to provide living hinge 50 and to allow chamfers 68 to be latched in, and removed from, grooves 86. For example, as will be understood by those skilled in the art, unitary structure 88 can be formed from an olefinic polymer material. Unitary structure 88 is formed from an olefinic polymer material. Unitary structure 88 is preferably formed from polypropylene. Unitary structure 88 is most preferably formed from a molding composition comprising 80 parts by weight of polypropylene and 20 parts by weight talc filler.

The flexible cover 56 extending from collar groove 74 covers the exterior surface of hinge 50 and covers at least a substantial portion of the outer side 58 of thumb lever 48. Cover 56 is preferably formed from a highly flexible polymer material (e.g., an injection molded elastomer or an ABS (acrylonitrile butadiene styrene blend rubber)), or from some other highly flexible material, such that (a) cover 56 freely flexes at points 90, 92, and 94 and thus does not interfere with the pivoting operation of thumb lever 48 and (b) cover 56 provides on thumb lever 48 a comfortable contacting surface 96 which flexes slightly to accommodate the user's thumb. The flexible material used in forming cover 56 preferably also has sufficient tack to impart a substantial degree of slip resistance to contacting surface 96. Ridges 98 or other features can be formed on contacting surface 96 to provide further slip resistance.

One material particularly well suited for use in forming cover 56 is MONOPRENE MP-2720 available from Quality Service Technology, St. Albens, Vt. MONOPRENE MP-2720 has a Shore A hardness rating of 23.

Casting actuator 12 is preferably formed by a co-molding process employing a mold having exchangeable pieces for forming two interrelated mold cavities. As will be understood by those skilled in the art, the co-molding process will preferably comprise the steps of: (a) injecting a suitable first material into the mold to form unitary molded structure 88; (b) exchanging the exchangeable pieces of the mold to thereby form the second mold cavity; and then (c) injecting a suitable second material into the second mold cavity to form flexible cover 56. The second material is injected into the second cavity at a time when the first material is still present in the mold. Thus, cover 56 bonds to collar groove 74, hinge 50, and thumb lever 48. To provide optimum bonding between flexible cover 56 and unitary structure 88, the second material is preferably injected into the mold before the first material has fully cooled.

Flexible cover 56 is preferably formed such that cover 56 and thumb lever 48 completely cover the opening 100 extending through collar 46. Due to the unitary nature of structure 88 and cover 56, inventive casting actuator 12 is at least substantially rattle free.

As will be understood by those skilled in the art, the inventive process used for forming casting actuator 12 can be modified to co-mold additional components. Further, if desired, inserts (e.g., a threaded metal collar for use as an alternative means for connecting casting actuator 12 to reel body 8) can be included in the mold. Additionally, lettering, graphics, and/or other features can be formed on contacting surface 96 by, for example, injecting an amount of the first molding material through the second material covering thumb lever 48. As will be understood by those skilled in the art, a hollow passageway 53 can optionally be formed through engaging structure 52 to allow injection of the first material through the second material.

The engaging structure 52 formed on the inside surface of thumb lever 54 can generally be any type of structure capable of operatively engaging the main shaft 6 of reel 2. Engaging structure 52 is preferably a boss having a cup 102 formed on the end thereof. Cup 102 preferably includes outwardly tapered upper and lower walls 104 and 106 and a convex, vertically oriented interior wall 108. The end of main shaft 6 is received in cup 102 such that convex interior wall 108 operatively engages shaft 6. FIGS. 11 and 12 illustrate that, as the user pivots thumb lever 48 inwardly, the point at which the end of shaft 6 contacts engaging structure 52 shifts downwardly on convex wall 108 in a manner such that the directional force applied by engaging structure 52 desirably remains substantially collinear with the longitudinal axis of main shaft 6.

Actuator retaining ring 44 assists in retaining casting actuator 12 on body collar 78. Retaining ring 44 includes a rounded end wall 110 and a plurality of (preferably three) substantially radial, interior ridges 112. With casting actuator 12 secured by chamfers 68 on body collar 78, actuator retaining ring 44 is positioned over actuator 12 such that (a) the rounded end wall 110 of retaining ring 44 contacts and holds the rounded outer surface 60 of collar 46 and (b) ridges 112 are received through collar notches 64 and in notches 114 formed in body collar 78. With ridges 112 received in body notches 114, retaining ring 44 is then rotated with respect to reel body 8 such that ridges 112 are received in attachment grooves 116 formed in the outer wall of body collar 78. In the same manner as ridges 152 and grooves 156 used for attaching front cover assembly 10 to body 8, retainer ridges 112 and attachment grooves 116 preferably have corresponding sloped surfaces which slidingly contact during the rotation of retaining ring 44 such that retaining ring 44 is pulled and held snugly against reel body 8.

FIGS. 11 and 12 depict the operative interaction of inventive casting actuator 12 with the main shaft 6 of reel 2. Prior to casting, thumb lever 48 and main shaft 6 are in the fully outward positions depicted in FIG. 11. When casting, the user presses and holds the contacting surface 96 of actuator 12. As the user presses contacting surface 96, thumb lever 48 pivots inwardly on hinge 50 in the manner depicted in FIG. 12. As lever 48 pivots inwardly, the convex interior wall 108 of engaging structure 52 imparts a direct actuating force to the end of main shaft 6 such that shaft 6 slides longitudinally forward. As discussed above, the forward longitudinal movement of main shaft 6 causes the spinnerhead (not shown) contained in reel 2 to clamp the fishing line against the tapered forward wall 122 of front cover assembly 10. When at the end of the casting motion the user releases thumb lever 48, living hinge 50 acts as a spring to return thumb lever 48 to the precasting position shown in FIG. 11. Subsequently, when the user turns the crank handle to return the spinnerhead to its winding position, the spring 36 provided on main shaft 6 moves shaft 6 into engaging cup 102 such that the end of shaft 6 again contacts engaging wall 108.

Another embodiment 160 of the thumb button provided by the present invention is depicted in FIGS. 20–22. As will be recognized by those skilled in the art, the general structure and shape of thumb button 160 can be the same as substantially any thumb button structure heretofore used in spincasting reels. Thumb button 160 comprises: a body 162 having an outer contacting surface 164; a pair of pivot pins 166, projecting outwardly from the upper portions of the sides of body 162, for pivotably securing button 160 in the back cover of a typical spincast reel; and an actuating post 168, projecting forwardly from body 162, for operably engaging the main shaft of the fishing reel.

In contrast to the spincast thumb buttons heretofore used in the art, inventive thumb button 160 is formed from a material (e.g., a flexible, slip resistant, injection molded elastomer) which (a) flexes to accommodate the user's thumb but (b) has sufficient strength to ensure that the original shape of the thumb button is maintained to a degree sufficient to allow continued operation of the thumb button. To protect the softer material of thumb button 160 from wear, wear-resistant caps (preferably metal or hard plastic caps) 170 and 172 are preferably provided on pivot pins 166 and on the end of actuating post 168.

Another embodiment 180 of the inventive thumb button assembly is depicted in FIGS. 23–28. Thumb button 180 has substantially the same structure as inventive thumb button 160 except that button 180 comprises a hard (preferably smooth) button structure 182 having a flexible contacting pad 184 positioned thereon. For attaching pad 184 to button structure 182, pad 184 includes a flexible lip 186 which is received over a ridge 188 formed around the periphery of hard button structure 182. Pad 184 provides a slip resistant contacting surface which flexes to accommodate the user's thumb. As will be understood by those skilled in the art, pad 184 can be formed from a flexible, injection, molded polymer.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed:

1. A front cover for a fishing reel comprising:
    a first cover piece having an exterior,
    a second cover piece including a second piece wall and having at least one aperture provided through said second piece wall, and attaching means for attaching said front cover to at least one of a rear cover and a frame of said fishing reel,
    wherein said second cover piece is positionable on said first cover piece such that said exterior of said first cover piece is visible through said aperture and
    neither said first cover piece nor said second cover piece is included in either said rear cover or said frame.

2. The front cover of claim 1 wherein:
    said second cover piece includes a plurality of said apertures and
    said exterior of said first cover piece is visible through said apertures.

3. The front cover of claim 2 wherein:
    said first cover piece comprises a tapered forward segment and a substantially cylindrical segment extending from said forward segment and
    said second cover piece is positionable on said first cover piece such that said apertures are positioned over said substantially cylindrical segment.

4. The front cover of claim 3 wherein:
    said tapered forward segment has a forward end and
    said first cover piece includes a fishing line opening formed in said forward end of said tapered forward segment.

5. The front cover of claim 2 wherein a visual feature is provided on said exterior of said first cover piece and said visual feature is visible through said apertures.

6. The front cover of claim 2 wherein said apertures are positioned through said second piece wall in an arrangement forming a gripping structure for operating said attaching means to selectively attach said front cover to and remove said front cover from said fishing reel.

7. The front cover of claim 1 wherein said second cover piece is a snap-on ring which snaps on to said first cover piece.

8. The front cover of claim 1 wherein said front cover is a front cover for a spincast fishing reel.

9. A front cover for a fishing reel comprising:
    a first cover piece having an exterior,
    a second cover piece including a second cover piece wall and having at least one aperture provide through said wall, and
    attaching means for attaching said front cover to at least one of a rear cover and a frame of said fishing reel,
    wherein said second cover piece is attached to said first cover piece such that said exterior of said first cover piece is visible through said aperture and
    neither said first cover piece nor said second cover piece is included in either said rear cover or said frame.

10. The front cover of claim 9 wherein:
    said second cover piece includes a plurality of said apertures and
    said exterior of said first cover piece is visible through said apertures.

11. The front cover of claim 10 wherein:
    said first cover piece comprises a tapered forward segment and a substantially cylindrical segment extending from said forward segment and
    said second cover piece is attached to said first cover piece such that said apertures are positioned over said substantially cylindrical segment.

12. The front cover of claim 11 wherein:
    said tapered forward segment has a forward end and
    said first cover piece includes a fishing line opening formed in said forward end of said tapered forward segment.

13. The front cover of claim 10 wherein a visual feature is provided on said exterior of said first cover piece and said visual feature is visible through said apertures.

14. The front cover of claim 10 wherein said apertures are positioned through said second piece wall in an arrangement forming a gripping structure for operating said attaching means to selectively attach said front cover to and remove said front cover from said fishing reel.

15. The front cover of claim 9 wherein said second cover piece is a snap-on ring which snaps on to said first cover piece.

16. The front cover of claim 9 wherein said front cover is a front cover for a spincast fishing reel.

17. A cover for a fishing reel comprising:
    a first cover piece having an exterior and
    a snap-on ring including a ring wall and having at least one aperture provided through said ring wall,
    wherein said snap-on ring snaps on to said first cover piece such that said exterior of said first cover piece is visible through said aperture.

18. The cover of claim 17 wherein said cover is a front cover for a spincast fishing reel.

19. The cover of claim 17 comprising a plurality of said apertures arranged to provide a gripping structure for selectively attaching said cover to and removing said cover from said fishing reel.

20. A spincast fishing reel of a type including a front cover and at least one of a frame and a rear cover, said front cover including an opening for a fishing line and said front cover being removably attachable to at least one of said frame or said rear cover, wherein the improvement comprises said front cover including:

a first cover piece having an exterior and a second cover piece including a wall having at least one aperture therethrough, wherein said second cover piece is positioned on said first cover piece such that said exterior of said first cover piece is visible through said aperture and wherein neither said first cover piece nor said second cover piece is included in either said frame or said rear cover.

21. The spincast fishing reel of claim 20 wherein:

said second cover piece includes a plurality of said apertures and said exterior of said first cover piece is visible through said apertures.

22. The spincast fishing reel of claim 21 wherein said apertures are arranged in said wall to form a gripping structure for grasping when attaching said front cover to and removing said front cover from said spincast fishing reel.

23. The spincast fishing reel of claim 20 wherein a visual feature is provided on said exterior of said first cover piece and said visual feature is visible through said aperture.

24. The spincast fishing reel of claim 20 wherein said second cover piece surrounds at least a portion of said first cover piece.

25. The spincast fishing reel of claim 20 wherein said second cover piece is a snap-on ring which snaps on to said first cover piece.

* * * * *

UNITED STATES PATENT AND TRADEMARK OFFICE
CERTIFICATE OF CORRECTION

PATENT NO : 6,138,935
DATED : Oct. 31, 2000
INVENTOR(S) : Kent L. Zwayer and Robert Worrell It is certified that an error appears in the above-identified patent and that said Letters Patent are hereby corrected as shown below:

Column 13, line 42, after the word "and" a new hanging paragraph should start with the word "attaching"

Column 14, line 20, the word "and" should be replaced by the word --or--

Signed and Sealed this

Eighth Day of May, 2001

*Attest:*

NICHOLAS P. GODICI

*Attesting Officer*     *Acting Director of the United States Patent and Trademark Office*